3,089,902
PRODUCTION OF METHYL METHACRYLATE USING ALKALI METAL SILICATE CATALYST
James F. Vitcha, New Providence, and Victor A. Sims, Bayonne, N.J., assignors to Air Reduction Company, Incorporated, New York, N.Y., a corporation of New York
No Drawing. Filed June 29, 1961, Ser. No. 120,519
5 Claims. (Cl. 260—486)

This invention relates to the synthesis of methyl methacrylate. More particularly, it relates to an improved catalytic vapor phase synthesis of methyl methacrylate by condensing methyl propionate with formaldehyde.

Methyl methacrylate is used extensively in the manufacture of synthetic resinous polymers and because of a steadily increasing demand for methyl methacrylate, two recently patented processes are of particular interest, namely, Redmon U.S. Patent No. 2,734,074 and Etherington U.S. Patent No. 2,821,543.

The present invention constitutes an improvement over the prior art such as that represented by these two patents, and resides in the discovery of an improved process for obtaining methyl methacrylate which comprises bringing mixed vapors of methyl propionate and formaldehyde into contact with a catalyst consisting of an alkali metal silicate impregnated on silica gel.

The process by which methyl methacrylate is formed according to the process of the present invention may be represented by the following overall reaction:

$$HCHO + CH_3CH_2COOCH_3 \rightarrow CH_2{=}C(CH_3)COOCH_3 + H_2O$$

which probably proceeds via the formation of an intermediate hydroxyester which then loses a molecule of water to yield the desired methyl methacrylate.

Various commercial sources of formaldehyde such as aqueous, alcoholic, or other solutions can be used in the practice of this invention in place of the pure anhydrous materials preferred by the prior art patentees noted above.

The reaction proceeds best at about 325° to 425° C., and preferably at 350° to 400° C., using an excess of ester to formaldehyde and at space velocities over a wide range of about 200 to about 6000 liters/hour/liter of catalyst. In general, higher space velocities (i.e., shorter contact times) are used at the higher operating temperatures and pressures.

Ester/formaldehyde molar ratios varying over rather wide ranges from about 2.5:1 to about 50:1 may be employed, although best results are obtained at ratios of about 5:1 to about 15:1. Within this preferred range high conversions and yields are obtained without excessive dilution of the reaction product with unreacted methyl propionate. The reaction proceeds well at substantially atmospheric pressure, although one may resort to superatmospheric or subatmospheric pressures if desired. The use of pressure facilitates recovery of methyl methacrylate. Generally no advantages are gained at pressures above 200 p.s.i.g. which are not also realized at lower pressures.

A number of various catalysts and catalyst supports were investigated in a reaction system comprising a calibrated reservoir, metering pump, vaporizer, carburetor, preheater, catalyst tube, condensing system and wet test meter all connected in series. In operation a suitably proportioned mixture of vapors of methyl propionate and formaldehyde—and methanol and/or water vapor, when these were also present in the raw materials used—was led through an electrically heated and insulated tube to a preheated tube having a temperature-controlled electrical heating jacket. The preheated vapors passed directly from the preheater to a catalyst-packed reactor tube wherein the temperature was maintained as uniform as possible. The vapors issuing from the discharge end of the reactor tube were led to a condensing system including cold traps and suitable apparatus to measure and analyze the off-gas.

Before each run the system was flushed with inert gas, then each unit was brought to the desired temperature, and the flow of the mixture of reactants into the apparatus was then initiated.

The methyl methacrylate is recovered from the condensate by fractional distillation under reduced pressure, or by any other suitable technique.

In accordance with the present invention, it has been found that methyl methacrylate can be readily obtained in high yields by vapor phase condensation of formaldehyde and methyl propionate provided that the catalyst employed consists essentially of an alkali metal silicate on silica gel. Best results are obtained when the alkali metal silicate constitutes from about ½% to about 10% of the weight of the catalyst. Potassium and sodium silicates are the preferred alkali metal silicates, since they not only give good results but they are heat stable and easily regenerated and readily available. However, other alkali metal silicates can be used.

This invention will now be illustrated with reference to the example which follows.

EXAMPLE

A vapor mixture of methyl propionate and formaldehyde was passed at atmospheric pressure through a catalyst consisting of an alkali metal silicate impregnated on silica gel at atmospheric pressure and space velocities of 200 to 500 liters/hour/liter of catalyst. The formaldehyde was either a commercial aqueous solution (37% HCHO plus 10–15% methanol, balance water) or a commercial methanolic solution (55% HCHO) as shown in Table I below. Also shown in Table I are the alkali metal constituent of the catalyst, the percentage by weight of alkali metal silicate in the catalyst, the mole ratio of methyl propionate to formaldehyde, the temperature, and the percentage conversion and yield, both based on formaldehyde.

Table I

| Run No. | Solvent for HCHO | Percent Alkali Silicate on Silica Gel | Ester: HCHO Mole Ratio | Temp., °C. | Percent Conv. | Percent Yield |
|---|---|---|---|---|---|---|
| 1 | Water | 1% K | 14:1 | 375 | 44 | 69 |
| 2 | Methanol | 3% K | 20:1 | 400 | 48 | 58 |
| 3 | do | 3% Na | 20:1 | 400 | 62 | ca. 90 |
| 4 | Water | 10% Na | 14:1 | 375 | 30 | 41 |

The potassium silicate catalysts of the present invention may be prepared as follows: an aqueous solution of potassium silicate having an $SiO_2{:}K_2O$ mole ratio of 3.92:1 is poured onto a suitable quantity of 6/16 mesh silica gel particles in a vessel, with vigorous stirring. The resulting mass is warmed while mixing and the heat is gradually increased over a two-hour period, after which it is held in a forced air oven at 375° C. for another three hours. Any fines are screened out and discarded.

The sodium silicate catalysts are similarly prepared except that a commercial water glass solution (40% solids; $SiO_2{:}Na_2O$ mole ratio approximately 3.3:1) is substituted for the potassium silicate solution.

Preferred embodiments of the invention have been described in the foregoing text, but it is to be understood that the invention is not to be construed as limited thereby, except as required by the appended claims.

We claim:
1. A process for the synthesis of methyl methacrylate which comprises contacting a vapor mixture comprising formaldehyde and methyl propionate with an alkali metal silicate on silica gel catalyst material at a temperature at which methyl methacrylate is formed, and recovering the methyl methacrylate from the product.

2. The process of claim 1 wherein the catalyst consists essentially of about 0.5 to 10% by weight of potassium silicate on silica gel.

3. The process of claim 1 wherein the catalyst consists essentially of about 0.5 to 10% by weight of sodium silicate on silica gel.

4. The process of claim 1 wherein the temperature is about 325° to 425° C.

5. The process of claim 1 wherein the mole ratio of ester to formaldehyde is between about 2.5:1 and 50:1.

References Cited in the file of this patent

UNITED STATES PATENTS

| | | |
|---|---|---|
| 2,734,074 | Redmon | Feb. 7, 1956 |
| 2,804,433 | Hervert et al. | Aug. 27, 1957 |
| 2,821,543 | Etherington | Jan. 28, 1958 |
| 3,014,958 | Koch et al. | Dec. 26, 1961 |